United States Patent
Radl

(10) Patent No.: US 6,712,530 B2
(45) Date of Patent: Mar. 30, 2004

(54) DIGITAL CAMERA BACK HOLDING

(76) Inventor: Bruce Radl, c/o Mosaic Imaging, 873 Great Rd., Stow, MA (US) 01775-1166

(*) Notice: Subject to any disclaimer, the term of this patent is extended or adjusted under 35 U.S.C. 154(b) by 0 days.

(21) Appl. No.: 10/003,848

(22) Filed: Oct. 23, 2001

(65) Prior Publication Data

US 2003/0077081 A1 Apr. 24, 2003

(51) Int. Cl.⁷ .................................................. G03B 17/04
(52) U.S. Cl. ........................ 396/341; 396/342; 396/429; 348/64
(58) Field of Search ................................. 396/341, 342, 396/347, 429; 348/64

(56) References Cited

U.S. PATENT DOCUMENTS

| | | | |
|---|---|---|---|
| 3,165,993 A | | 1/1965 | Stern |
| 3,832,723 A | | 8/1974 | Nickel |
| 4,591,251 A | | 5/1986 | Fisher |
| 5,561,458 A | * | 10/1996 | Cronin et al. ............ 348/231.7 |
| 5,570,146 A | | 10/1996 | Collette |

* cited by examiner

*Primary Examiner*—David M. Gray
(74) *Attorney, Agent, or Firm*—Fish & Richardson P.C.

(57) ABSTRACT

A digital camera back holder for use with a technical camera suspends the body of the digital camera back so that the sensor position is substantially forward of the rear standard.

6 Claims, 3 Drawing Sheets

DIGITAL CAMERA BACK HOLDING

TECHNICAL FIELD

The present invention relates in general to digital camera back holding, and more particularly to a digital camera back holder for use with a technical camera.

BACKGROUND OF THE INVENTION

Technical or view cameras typically have multiple articulated front and rear standards. The front standard typically carries a lens. The rear standard typically carries a recording medium, such as a sheet or roll of film. The rear standard typically carries a film holder just behind upright members. Typically the film is a sheet measuring 4 in. by 5 in. The lens, carried by the front standard, is held at an appropriate distance to form a focused image on the film. The front and rear standards are then separated from each other and connected to a flexible bellows to prevent light from reaching the film, other than through the lens. The separation of the standards, and the flexibility of the bellows, allows the standards to pivot upon a vertical axis (swing motion), or a horizontal axis (tilt motion), providing multiple focus plane options to the photographer.

The film may be replaced by digital sensors and associated electronics in a digital camera back. Digital camera backs with two-dimensional sensors (pixels distributed in a rectangular grid pattern) typically have sensor dimensions substantially smaller than 4 in. by 5 in. To obtain a field of view similar to that when film is used with the digital camera back, a lens of relatively shorter focal length is used. This arrangement requires that the two standards must be moved closer to each other to bring the image into focus. The lower limit of focal length is determined by the distance from the sensor location to the lens when the standards have been brought into contact with each other. This property not only limits the selection of lenses, but it also limits the pivotal movement of the standards. When the standards are in contact with each other, or when the bellows are fully compacted, swing and tilt motions are not available.

It is an important object of the invention to provide an improved digital camera back holder.

SUMMARY OF THE INVENTION

According to the invention, a digital camera back holder suspends the body of the digital camera back so that the sensor position is substantially forward of the rear standard. This feature allows the sensor to occupy a position much closer to the front standard, which may now carry a much shorter focal length lens and still maintain a substantial separation between its upright members. Thus, the invention simultaneously converts the camera from film recording capability to electronic recording capability and adjusts the relative position of the focal plane. This arrangement allows pivotal movement of the camera standards when fitted with lenses appropriate in focal length for the electronic sensor.

In a specific form the digital back camera holder according to the invention is a hollow can formed with front and rear openings with a rim surrounding the rear opening. The rim attaches to the exterior of the rear standard as does a standard film holder. The front of the can carries a clamping mechanism inside that grips the digital camera back near the plane of its sensor. This digital back camera holder according to the invention can be used for any digital camera back that meets the size requirements to be inserted within the body of the technical camera. The multiple articulated features of the technical camera may be used while recording images with electronic sensors through suitable lenses that are substantially smaller than those it was originally designed to carry.

Numerous other features, objects and advantages of the invention will become apparent from the following detailed description when read in connection with the accompanying drawing in which:

DETAILED DESCRIPTION

Figure 1:
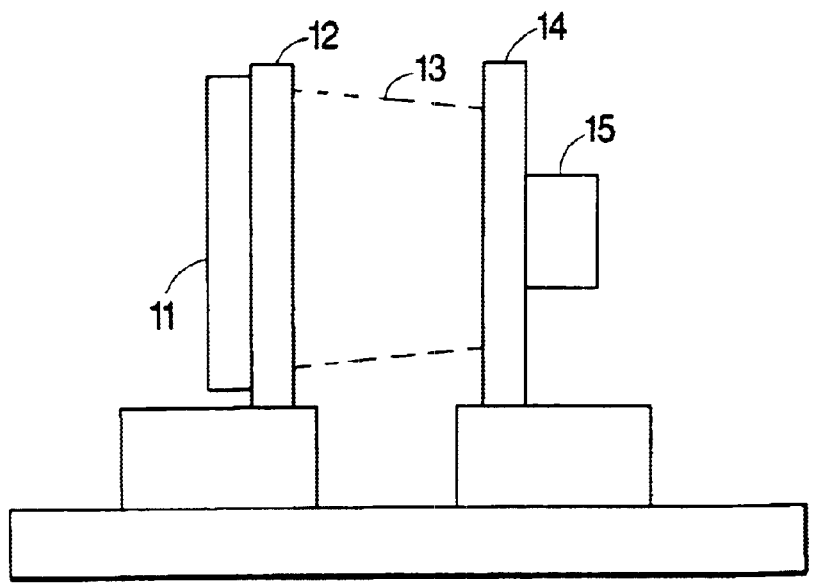
FIG. 1 is a diagrammatic representation of a conventional technical or view camera with film holder attached.

With reference now to the drawing and more particularly FIG. 1 thereof, there is shown a diagrammatic representation of a technical or view camera with film holder attached as in the prior art. The camera includes a film holder 11 attached to a rear standard 12. Bellows 13 intercouples rear standard 12 and front standard 14, which carries lens 15. Bellows 13 prevents light from entering between the lens and the film carried by film holder 11. The mechanisms that allow rear standard 12 and front standard 14 to translate and rotate about several axes is not shown.

Figure 2:
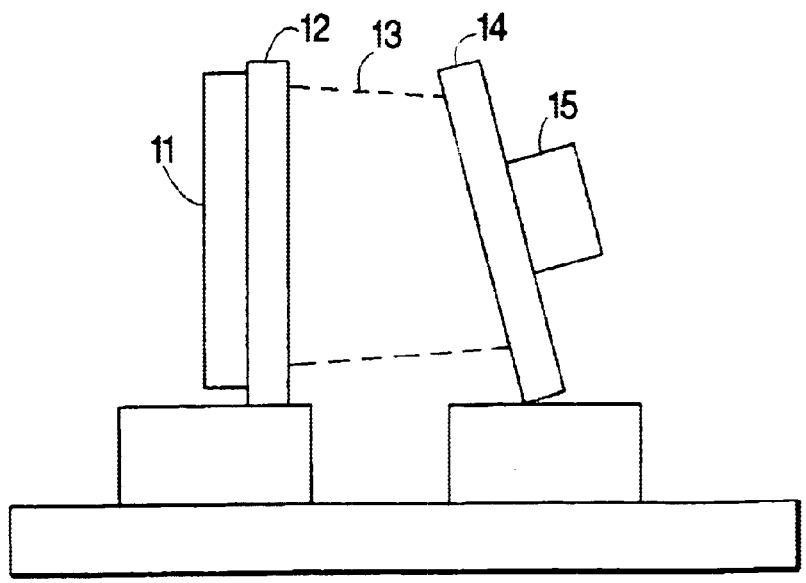
FIG. 2 is a view of the technical camera of FIG. 1 with the front standard tilted.

Referring to FIG. 2, the view camera of FIG. 1 is shown with front standard 14 tilted rearward in connection with performing a specialized focusing action.

Figure 3:
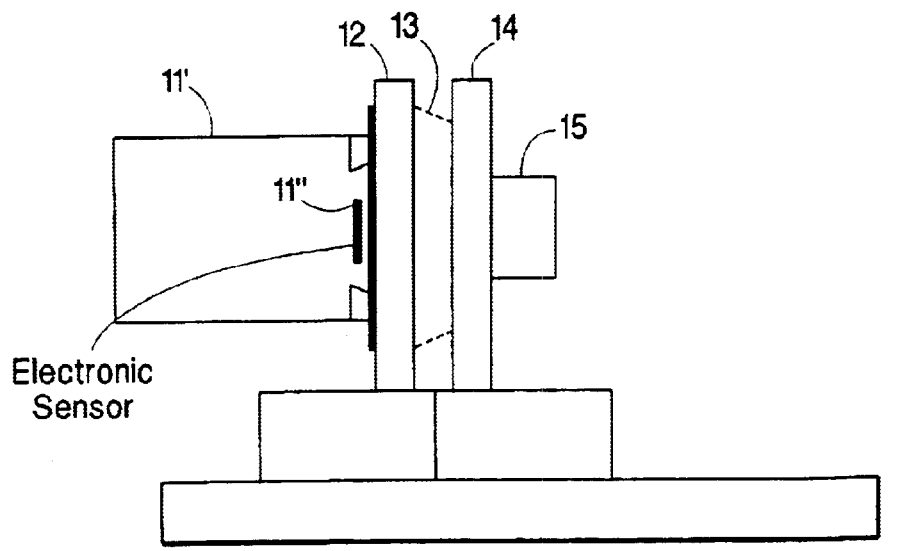
FIG. 3 is a view of a technical camera with digital camera back attached to the rear standard in place of the film holder according to the prior art with the standards moved to a position of minimum separation precluding pivotal motion.

Referring to FIG. 3, there is shown a technical camera with a digital camera 11' in the place of film holder 11 having an electronic sensor 11" in place of the film. The relatively small size of the sensor 11" of camera 11' requires a proportionately shorter focal length lens for an equivalent field of view to be recorded by sensor 11". When the rear standard 12 and front standard 14 are moved to focus the image focused by the shorter focal length lens onto sensor 11", they must come in close proximity to each other. In this position, they are no longer able to tilt as in FIG. 2, either because the uprights physically interfere with each other, or the bellows 13 cannot be further compressed.

Figure 4:
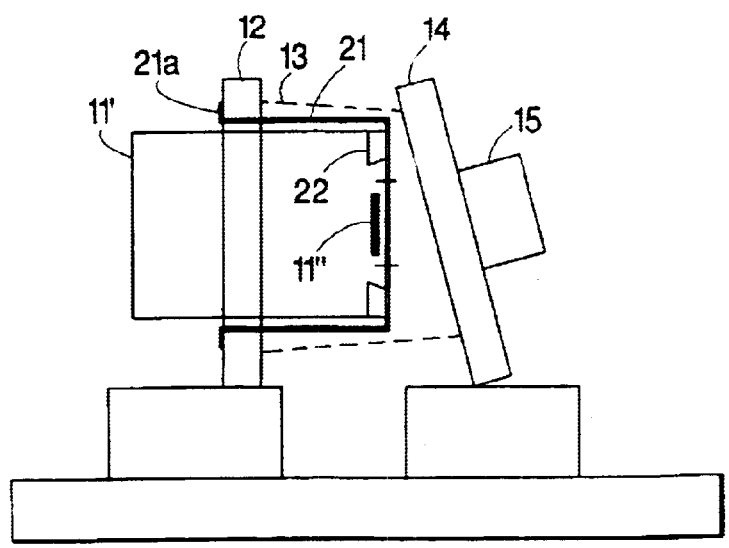
FIG. 4 is a diagrammatic representation of a technical camera converted for use with electronic sensor of relatively smaller size according to the invention.

Referring to FIG. 4, there is shown a technical camera converted for use with electronic sensor of relatively smaller size according to the invention. The digital camera back holder 21 is formed with an exterior rim 21A that mates with the rear standard 12 of a commercial technical camera to provide mechanical attachment and a light-tight seal. A central aperture 23 in holder 21 allows light to pass from lens 15 to sensor 11". A clamp 22 securely holds the digital camera to provide mechanical attachment and a light-tight seal. The digital camera back holder 21 is typically of square cross-section and made of aluminum.

Figure 5:
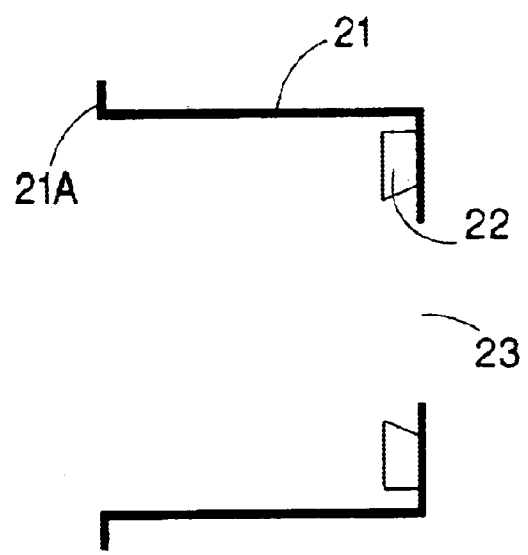
FIG. 5 is a diagrammatic representation of the digital camera back holder according to the invention.

Referring to FIG. 5, there is shown a diagrammatic representation of the novel digital camera back holder 21 having rim 21A, central aperture 23 and clamp 22 as described above in connection with FIG. 4.

There has been described novel apparatus and techniques for digital camera back holding. It is evident that those skilled in the art may now make numerous uses of and departures from the specific apparatus and techniques disclosed herein without departing from the inventive concepts. Consequently, the invention is to be construed as embracing each and every novel feature and novel combination of features present in or possessed by the apparatus and techniques disclosed herein and limited solely by the spirit and scope of the appended claims.

What is claimed is:

1. Digital camera back holding apparatus for attachment to a technical camera having a rear standard for receiving a film holder, a front standard for carrying a lens and bellows intercoupling the front and rear standards comprising, a hollow holder formed with front and rear openings and with a rim around the rear opening adapted to engage the rear of said rear standard in mechanical and light-tight relationship adapted to extend forward of said rear standard inside said bellows and adapted to support a digital camera with the camera light sensor adjacent to said front opening.

2. Digital camera back holding apparatus in accordance with claim 1 and further comprising, a clamp for securely holding a digital camera in said hollow holder.

3. Digital camera back holding apparatus in accordance with claim 1 and further comprising, said technical camera with said hollow holder extending into said bellows with said rim in light-tight mechanical engagement with the rear of said rear standard.

4. Digital camera back holding apparatus in accordance with claim 2 and further comprising a digital camera having a sensor and seated in said hollow holder in engagement with said clamp with said sensor adjacent to said front opening.

5. A method of electronic imaging with a technical camera having a rear standard to which a film holder may be attached, a front standard carrying a lens and bellows intercoupling the front standard and rear standard providing a light-tight path therebetween including, seating a hollow holder having front and rear openings with a rim around the rear opening through said rear standard into said bellows with said rim mechanically attached to the rear of the rear standard in light-tight relationship.

6. The method of claim 5 and further including placing a digital camera having a sensor in said hollow holder with said sensor adjacent to said front opening.

* * * * *